United States Patent
Nagarajan et al.

(10) Patent No.: US 10,193,812 B2
(45) Date of Patent: Jan. 29, 2019

(54) MULTICAST LOAD BALANCING IN MULTIHOMING EVPN NETWORKS

(71) Applicant: Juniper Networks, Inc., Sunnyvale, CA (US)

(72) Inventors: Vikram Nagarajan, Bangalore (IN); Wen Lin, Andover, MA (US); Robert W. Kebler, Newburyport, MA (US); Princy T. Elizabeth, Bangalore (IN); Kapil Arora, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/655,210

(22) Filed: Jul. 20, 2017

(65) Prior Publication Data

US 2018/0287946 A1 Oct. 4, 2018

(30) Foreign Application Priority Data

Mar. 31, 2017 (IN) .............................. 201741011652

(51) Int. Cl.
*H04L 12/46* (2006.01)
*H04L 12/801* (2013.01)
(Continued)

(52) U.S. Cl.
CPC .............. *H04L 47/15* (2013.01); *G06F 9/542* (2013.01); *H04L 63/0272* (2013.01);
(Continued)

(58) Field of Classification Search
CPC ... H04L 45/245; H04L 12/4625; H04L 45/66; H04L 12/4641; H04L 61/6022;
(Continued)

(56) References Cited

U.S. PATENT DOCUMENTS 8,125,928 B2 * 2/2012 Mehta ................. H04L 12/4625
370/254
8,953,446 B1 2/2015 Wang et al.
(Continued)

FOREIGN PATENT DOCUMENTS

EP 3013006 A1 4/2016
EP 3070877 A1 9/2016

OTHER PUBLICATIONS

Sajassi, et al., "BGP MPLS-Based Ethernet VPN," Internet Engineering Task Force; RFC 7432, Feb. 2015, 56 pp.
(Continued)

*Primary Examiner* — Sai Aung
(74) *Attorney, Agent, or Firm* — Shumaker & Sieffert, P.A.

(57) ABSTRACT

In general, techniques are described for load-balancing responsibility for forwarding of multicast traffic into an active-active Ethernet segment between two or more multi-homed provider edge (PE) routers in an Ethernet Virtual Private Network (EVPN). In one example, a PE router may receive an Internet Group Management Protocol (IGMP) join report for a multicast group. The PE router may send join synch routes used to synchronize the join report for the multicast group across the Ethernet segment. The PE router may deterministically determine whether the PE router is configured to be an elected multicast forwarder for one of a plurality of multicast groups. If the PE router is elected a multicast forwarder, the PE router may configure a forwarding state of the PE router to ignore a designated forwarder calculation and to forward the multicast traffic into the Ethernet segment regardless of whether the PE router is a designated forwarder.

20 Claims, 5 Drawing Sheets

(51) Int. Cl.
- *H04L 29/06* (2006.01)
- *G06F 9/54* (2006.01)
- *H04L 12/803* (2013.01)
- *H04L 12/18* (2006.01)

(52) U.S. Cl.
CPC .......... *H04L 65/4076* (2013.01); *H04L 12/18* (2013.01); *H04L 47/125* (2013.01)

(58) Field of Classification Search
CPC ..... H04L 12/4633; H04L 45/02; H04L 45/28; H04L 45/586; H04L 49/70
See application file for complete search history.

(56) References Cited

U.S. PATENT DOCUMENTS

| | | | | |
|---|---|---|---|---|
| 9,461,840 | B2* | 10/2016 | Chatwani | H04L 12/4625 |
| 2006/0268869 | A1 | 11/2006 | Boers et al. | |
| 2012/0014386 | A1* | 1/2012 | Xiong | H04L 29/12028 |
| | | | | 370/392 |
| 2012/0033668 | A1* | 2/2012 | Humphries | H04L 12/185 |
| | | | | 370/390 |
| 2012/0033669 | A1* | 2/2012 | Mohandas | H04L 45/245 |
| | | | | 370/392 |
| 2014/0226531 | A1 | 8/2014 | Farkas et al. | |
| 2014/0269710 | A1* | 9/2014 | Sundaram | H04L 45/302 |
| | | | | 370/392 |

OTHER PUBLICATIONS

Fenner, "Internet Group Management Protocol, Version 2," Network Working Group; RFC 2236, Nov. 1997, 24 pp.

Cain et al., "Internet Group Management Protocol, Version 3," Network Working Group; RFC 3376, Oct. 2002, 53 pp.

Holbrook et al., "Using Internet Group Management Protocol Version 3 (IGMPv3) and Multicast Listener Discovery Protocol Version 2 (MLDv2) for Source-Specific Multicast," Network Working Group; RFC 4604, Aug. 2006, 11 pp.

Sajassi, et al., "IGMP and MLD Proxy for EVPN," BESS Working Group, Internet-Draft, Mar. 27, 2017, 25 pp.

Sajassi, et al., "IGMP and MLD Proxy for EVPN," BESS Working Group, Internet-Draft, Oct. 17, 2015, 13 pp.

Deering, "Host Extensions for IP Mutlicasting" Network Working Group; RFC 1112, Aug. 1989, 16 pp.

Lin et al., "EVPN Inter-Subnet Multicast Forwarding, draft-Lin-bess-evpn-irb-mcast-00.txt," BESS, Internet-Draft, Apr. 3, 2015, 8 pp.

Extended Search Report from counterpart European Application No. 18164348.7, dated Oct. 4, 2018, 13 pp.

* cited by examiner

MULTICAST LOAD BALANCING IN MULTIHOMING EVPN NETWORKS

This application claims the benefit of Indian Provisional Patent Application No. 201741011652, filed on Mar. 31, 2017, the entire content of which is incorporated herein by reference.

TECHNICAL FIELD

The invention relates to computer networks and, more particularly, Ethernet Virtual Private Networks (EVPNs).

BACKGROUND

A computer network is a collection of interconnected computing devices that can exchange data and share resources. Example computing devices include routers, switches or other layer two (L2) devices that operate within the second layer of the Open Systems Interconnection (OSI) reference model, i.e., the data link layer, and routers or other layer three (L3) devices that operate within the third layer of the OSI reference model, i.e., the network layer. Network devices within computer networks often include a control unit that provides control plane functionality for the network device and forwarding components for routing or switching data units.

An Ethernet Virtual Private Network ("EVPN") may be used to extend two or more remote L2 customer networks through an intermediate L3 network (usually referred to as a "provider network"), in a transparent manner, i.e., as if the intermediate L3 network does not exist. In particular, the EVPN transports L2 communications, such as Ethernet packets or "frames," between customer networks via the intermediate L3 network. In a typical configuration, provider edge ("PE") network devices (e.g., routers and/or switches) coupled to the customer edge ("CE") network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

SUMMARY

In general, the disclosure describes techniques for load-balancing responsibility for forwarding multicast traffic into an active-active Ethernet segment (ES) between two or more multi-homed provider edge (PE) routers and a customer edge (CE) router in an Ethernet Virtual Private Network (EVPN).

For example, in the EVPN, a CE router is often multi-homed to two or more PE routers via an ES that appears as a link aggregation group (LAG) to the CE router. In such situations, a first one of the PE routers typically receives a join request for a multicast group from the CE router, and sends a join synch route to the other PE routers on the ES to synchronize a multicast state for the multicast group. According to the disclosed techniques and unlike conventional techniques, each of the PE routers may deterministically determine whether the PE router is to be configured as an elected multicast forwarder for forwarding multicast traffic of the multicast group to the CE router regardless of which of the PE routers is a designated forwarder (DF) or non-designated forwarder (non-DF) for the Ethernet segment. The PE router of the multi-homing PEs that is determined to be the multicast forwarder for the specific multicast group requested by the join proceeds to forward multicast traffic for that specific group into the active-active Ethernet segment regardless of the particular PE router that has been elected designated forwarder for the specific Ethernet segment.

In one example, a method includes receiving, by a provider edge (PE) router of a plurality of PE routers configured with an Ethernet Virtual Private Network (EVPN) instance reachable by an Ethernet segment connecting the plurality of PE devices to a customer edge (CE) router that is multi-homed to the plurality of PE routers over the Ethernet segment, an Internet Group Management Protocol (IGMP) join report for a multicast group. The method also includes sending, by the PE router and to the plurality of PE routers, one or more Border Gateway Protocol (BGP) join synch routes used to synchronize the IGMP join report for the multicast group across the Ethernet segment. The method also includes deterministically determining, by the PE router, whether the PE router is configured to be an elected multicast forwarder for at least one of a plurality of multicast groups. The method also includes in response to determining that the PE router is configured to be the elected multicast forwarder for the one of the plurality of multicast groups, configuring, by the PE router, a forwarding state of the PE router to forward multicast traffic for the one of the plurality of multicast groups into the Ethernet segment and to ignore a designated forwarder election for the Ethernet segment. The method also includes receiving, by the PE router, multicast traffic from an ingress PE router of the plurality of PE routers. The method also includes forwarding, by the PE router, the multicast traffic into the Ethernet segment for the one of the plurality of multicast groups.

In another example, a provider edge (PE) router includes: a memory; and one or more processors operably coupled to the memory, wherein the one or more processors and memory are configured to: receive configuration data configuring the PE router with an Ethernet Virtual Private Network (EVPN) instance reachable by an Ethernet segment connecting a plurality of PE devices, including the PE router, to a customer edge (CE) router that is multi-homed to the plurality of PE routers over the Ethernet segment; receive an Internet Group Management Protocol (IGMP) join report for a multicast group; send, to the plurality of PE routers, one or more Border Gateway Protocol (BGP) join synch routes used to synchronize the IGMP join report for the multicast group across the Ethernet segment; deterministically determine whether the PE router is configured to be an elected multicast forwarder for one of a plurality of multicast groups; in response to determining that the PE router is configured to be the elected multicast forwarder for the one of the plurality of multicast groups, configure a forwarding state of the PE router to forward multicast traffic for the one of the plurality of multicast groups into the Ethernet segment and to ignore a designated forwarder election for the Ethernet segment; receive the multicast traffic from an ingress PE router of the plurality of PE routers; and forward the multicast traffic into the Ethernet segment for the one of the plurality of multicast groups.

In another example, a computer-readable storage medium comprising instructions for causing one or more programmable processors to: receive configuration data configuring the PE router with an Ethernet Virtual Private Network (EVPN) instance reachable by an Ethernet segment connecting a plurality of PE devices, including the PE router, to a customer edge (CE) router that is multi-homed to the plurality of PE routers over the Ethernet segment receive an Internet Group Management Protocol (IGMP) join report for a multicast group; send, to the plurality of PE routers, one or more Border Gateway Protocol (BGP) join synch routes used to synchronize the IGMP join report for the multicast group across the Ethernet segment; deterministically determine whether the PE router is configured to be an elected multicast forwarder for one of a plurality of multicast groups; in response to determining that the PE router is configured to be the elected multicast forwarder for the one of the plurality of multicast groups, configure a forwarding state of the PE router to forward multicast traffic for the one of the plurality of multicast groups into the Ethernet segment and to ignore a designated forwarder election for the Ethernet segment; receive the multicast traffic from an ingress PE router of the plurality of PE routers; and forward the multicast traffic into the Ethernet segment for the one of the plurality of multicast groups.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
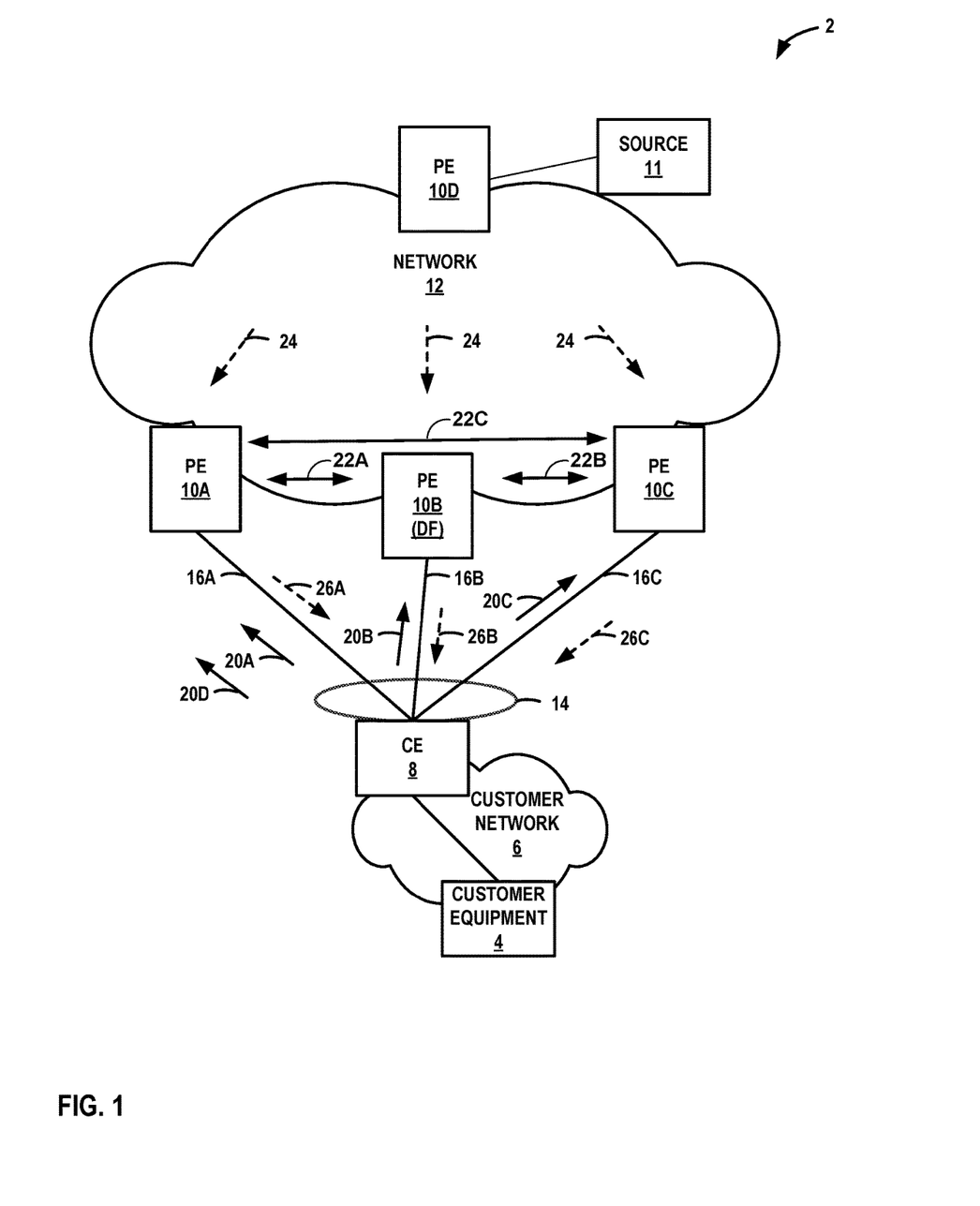
FIG. 1 is a block diagram illustrating an example network system for performing load-balancing responsibility for forwarding of multicast traffic into an active-active Ethernet segment between two or more multi-homed provider edge routers in an Ethernet Virtual Private Network, in accordance with the techniques described in this disclosure.

FIG. 1 is a block diagram illustrating an example network system 2 for performing load-balancing responsibility for forwarding of multicast traffic into an active-active Ethernet segment between two or more multi-homed provider edge (PE) routers in an Ethernet Virtual Private Network (EVPN), in accordance with the techniques described in this disclosure.

As shown in FIG. 1, network system 2 includes a customer network 6 and a service provider network 12 (alternatively referred to herein as the "EVPN core 12") configured to host an EVPN core to connect customer network 6 to other remote customer networks or other network resources (not shown in FIG. 1). PE routers 10A-10C ("PE routers 10") of service provider network 12 provide customer equipment 4 associated with customer network 6 with access to service provider network 12 via CE router 8. Communication links 16A-16C ("communication links 16") may be Ethernet, Asynchronous Transfer Mode (ATM), or any other suitable network connections. The configuration of network system 2 illustrated in FIG. 1 is merely an example. For example, an enterprise network system may include more than one customer network. Nonetheless, for ease of description, only a single customer network 6 is illustrated in FIG. 1.

PE routers 10 and CE router 8 may each represent a router in the example of FIG. 1. However, techniques of the disclosure may be implemented using switches or other suitable network devices that participate in a L2 virtual private network ("L2VPN") service, such as an EVPN. Customer network 6 may be a network for geographically separated sites of an enterprise. Customer network 6 includes customer equipment 4, such as, one or more non-edge switches, routers, hubs, gateways, security devices, such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Further, service provider network 12 may couple to one or more computer networks not depicted in FIG. 1. Moreover, although the elements of network system 2 are illustrated as being directly coupled, it should be understood that one or more additional network elements may be included along any of the illustrated links 16A-16C, such that the network elements of system 2 are not directly coupled.

Service provider network 12 represents a publicly accessible computer network that is owned and operated by a service provider, which is usually a large telecommunications entity or corporation. Service provider network 12 may be an L3 computer network, where reference to a layer followed by a number refers to a corresponding layer in the OSI model. Service provider network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Service provider network 12 typically provides a number of residential and business services, including residential and business class data services (which are often referred to as "Internet services" in that these data services permit access to the collection of publicly accessible networks referred to as the Internet), residential and business class telephone and/or voice services, and residential and business class television services. One such business data service offered by service provider network 12 includes EVPN service. For example, an EVPN is a service that provides a form of L2 connectivity across an intermediate L3 network, such as service provider network 12, to interconnect two L2 customer networks, such as customer network 6 and another remote customer network (not shown), that are usually located in two different geographic areas. Often, an EVPN is transparent to the customer networks in that these customer networks are not aware of the intervening intermediate service provider network and instead act and operate as if these two customer networks were directly connected and formed a single L2 network. In this way, an EVPN enables a form of a transparent LAN connection between two geographically distant customer sites that each operates an L2 network and, for this reason, EVPN may also be referred to as a "transparent LAN service."

An EVPN may operate over a Multi-Protocol Label Switching (MPLS) configured network and use MPLS labels to forward network traffic accordingly. MPLS is a mechanism used to engineer traffic patterns within IP networks according to the routing information maintained by the routers in the networks. By utilizing MPLS protocols, such as Label Distribution protocol (LDP) or Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path. Additional information with respect to the EVPN protocol is described in "BGP MPLS-Based Ethernet VPN," RFC 7432, Internet Engineering Task Force (IETF), February 2015, the entire contents of which is incorporated herein by reference.

To configure an EVPN, a network operator of service provider network 12 configures, via configuration or management interfaces, various devices included within service provider network 12 that interface with L2 customer network 6. The EVPN configuration may include an EVPN instance ("EVI"), which comprises one or more broadcast domains. The EVPN instance is configured within service provider network 12 for customer network 6 to enable customer equipment 4 within customer network 6 to communicate with other customer equipment via the EVI as if the customer equipment were directly connected via an L2 network. In some examples, EVI may be associated with a virtual routing and forwarding instance ("VRF") on a PE router, such as any of PE routers 10A-10C. Consequently, multiple EVIs may be configured on PE routers 10A-10C for an Ethernet segment, e.g., Ethernet segment 14, each of the EVIs providing a separate, logical L2 forwarding domain. In this way, multiple EVIs may be configured that each includes one or more of PE routers 10A-10C.

For example, Ethernet segment 14 may comprise a first EVI that includes PE routers 10A-10C, and a second EVI that includes only PE routers 10A and 10B. In some examples, Ethernet Tags are then used to identify a particular broadcast domain, e.g., a VLAN, in an EVI. A PE router may advertise a unique EVPN label per <Ethernet Segment Identifier (ESI), Ethernet Tag> combination. This label assignment methodology is referred to as a per-<ESI, Ethernet Tag> label assignment. Alternatively, a PE router may advertise a unique EVPN label per media access control (MAC) address. In still another example, a PE router may advertise the same single EVPN label for all MAC addresses in a given EVI. This label assignment methodology is referred to as a per EVI label assignment.

In one example, to operate Ethernet segment 14 in an active-active Ethernet segment, PE routers 10A-10C perform an EVPN designated forwarder election for multi-homed Ethernet segment 14. In EVPN, a CE router is said to be "multi-homed" when it is coupled to two or more physically different PE routers on the same EVI when the PE routers are resident on the same physical Ethernet segment. For example, CE router 8 is coupled to PE routers 10A-10C via links 16A-16C, respectively, where PE routers 10A-10C are capable of providing L2 customer network 6 access to EVPN via CE router 8. Multi-homed networks are often employed by network operators so as to improve access to EVPN provided by service provider network 12 should a failure in one of links 16A-16C occur. When a CE router is multi-homed to two or more PE routers, either one or all of the multi-homed PE routers are used to reach the customer site depending on the multi-homing mode of operation. The PE router that assumes the primary role for forwarding broadcast, unicast, and/or multicast (BUM) traffic to the CE router is called the designated forwarder ("DF" or "DF router"). In a typical EVPN configuration, the multi-homing PE routers participate in DF election for each Ethernet segment identifier (ESI) for Ethernet segment 14.

In the example of FIG. 1, when providing EVPN service to customer network 6, PE routers 10A-10C and CE router 8 typically perform MAC address learning to efficiently forward L2 network communications in service provider network 12. That is, as PE routers 10A-10C and CE router 8 forward Ethernet frames, the routers learn L2 state information for the L2 network, including MAC addressing information for customer equipment 4 within the network and the physical ports through which customer equipment 4 are reachable. PE routers 10A-10C and CE router 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

As further described below, as PE routers 10A-10C learn the MAC address for customer equipment 4 reachable through local attachment circuits, PE routers 10A-10C utilize MAC address route advertisements of an L3 routing protocol, e.g., Border Gateway Protocol (BGP) to share the learned MAC addresses and to provide an indication that the MAC addresses are reachable through the particular PE router that is issuing the route advertisement. In the EVPN implemented using PE routers 10A-10C for a given EVI, each of PE routers 10A-10C advertises the locally learned MAC addresses to other PE routers 10 using a BGP router advertisement, also referred to herein as a "MAC route" or a "MAC advertisement route." A MAC advertisement route typically specifies an individual MAC address of customer equipment 4 along with additional forwarding information such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Additional example information with respect to BGP is described in "BGP MPLS-Based Ethernet VPN," RFC 7432, as referenced above.

In the example of FIG. 1, source device 11 operates as a source for multicast traffic 24 to be delivered through to customer equipment 4 by way of the EVPN. In general, multicast network traffic is associated with specific multicast groups. More specifically, multicast traffic is typically designated by a unique combination of a particular multicast group and a particular source for the multicast group. For example, multicast network traffic 24, such as a particular multicast stream of content, may be uniquely designated with a (Source, Group), i.e., (S, G), label to designate a source of the traffic and a multicast group to which the traffic belongs. PE routers 10A-10C of Ethernet segment 14 may use Internet Group Management Protocol (IGMP) to communicate multicast group membership information to neighboring routers to establish a multicast group state for routing purposes. For example, PE routers 10A-10C of Ethernet segment 14 may use the IGMP protocol to receive Join and Leave messages from hosts or receivers, e.g., customer equipment 4, connected to CE router 8. Upon receiving, from the hosts, a notification to subscribe in the membership of a specific multicast group, one of PE routers 10A-10C forwards this information to the other PE routers 10 of Ethernet segment 14 over the EVPN using Ethernet Multicast Source Group Route Network Layer Reachability Information (NLRI). The NLRI also tracks the IGMP protocol version of a recipient as well as any source filtering for a given group membership. Thus, PE routers 10A-10C of Ethernet segment 14 may be informed of the group membership information and route multicast network traffic of the requested multicast group to CE device 8 based on the (S, G) label of the multicast traffic. Additional details of IGMP are provided within "Host Extensions for IP Multicasting," RFC 1112, Internet Engineering Task Force (IETF), August 1989; "Internet Group Messaging Protocol, Version 2," RFC 2236, Internet Engineering Task Force (IETF), November 1997; "Internet Group Management Protocol, Version 3," RFC 3376, Internet Engineering Task Force (IETF), October 2002; and "Using Internet Group Management Protocol Version 3 (IGMPv3) and Multicast Listener Discovery Protocol Version 2 (MLDv2) for Source-Specific Multicast," RFC 4604, Internet Engineering Task Force (IETF), August 2006; and "IGMP and MLD Proxy for EVPN," draft-saassi-bess-evpn-igmp-mld-proxy-01, Oct. 28, 2016, the entire contents of each of which is incorporated herein by reference.

In the example of FIG. 1, Ethernet segment 14 is configured to operate in all-active redundancy mode. In all-active redundancy mode, each of PE routers 10A-10C attached to Ethernet segment 14 is configured to forward traffic to and from customer network 6. While operating in this mode, any of PE routers 10A-10C may receive traffic from customer network 6, and may receive from CE router 8 a respective one of IGMP join reports 20A-20C (collectively, "IGMP join reports 20" or "IGMP membership reports 20"). Upon receiving the respective one of IGMP join reports 20, each of PE routers 10A-10C attached to Ethernet segment 14 communicates the multicast group membership information to neighboring PE routers such that the neighboring PE routers may synchronize IGMP Join and Leave Group state across Ethernet segment 14. The IGMP Join and Leave Group state may be represented as (x, G), where "x" may be either any source (*) or a particular source (S), for each EVI on Ethernet segment 14, and "G" is a multicast group. For example, PE router 10A may receive IGMP join report 20A which notifies PE router 10A the membership for which customer equipment 4 is subscribing, e.g., a first multicast group. PE router 10A may communicate the information from IGMP join report 20A to PE routers 10B and 10C via an IGMP join synch route, as further described below. PE routers 10B and 10C may receive the IGMP join synch route and synchronize the IGMP join group state such that PE routers 10A-10C may forward multicast traffic 24 received over the EVPN core 12 to the corresponding multicast group. By synchronizing IGMP Join and Leave Group state, the DF, e.g., router 10B, for a particular Ethernet segment, EVPN Instance, and Bridge Domain (BD) (hereinafter, "[ES, EVI, DB]") may correctly advertise or withdraw routes to the EVPN core for the multicast traffic for that multicast group.

PE routers 10 use control plane signaling with different route types (herein referred to as "EVPN routes") to implement the EVPN service in service provider network 12. EVPN defines BGP NLRI, and in particular, defines different route types. The NLRI is carried in BGP using BGP Multiprotocol Extensions. EVPN route types include but are not limited to Ethernet Auto-Discovery (AD) per Ethernet segment routes (Type-1), MAC advertisement routes (Type-2), Inclusive Multicast Ethernet Tag (IMET) (Type-3), Ethernet Segment routes (Type-4), and BGP join synch routes (Type-7).

PE devices 10A-10D may advertise Ethernet AD routes (Type-1) specifying the relevant ESI for the Ethernet segment for the EVI. That is, each of PEs 10 may advertise an Ethernet AD route per Ethernet segment to advertise reachability of the PE device for the Ethernet segment. An Ethernet AD route advertised by each of PE devices 10A-10D specifies a Route Distinguisher (RD) (which may include, e.g., an Internet Protocol (IP) address of the originating PE), ESI, Ethernet Tag Identifier, and MPLS label, for example. Per RFC 7432, the Ethernet AD route advertisement may also include an ESI Label extended community attribute to enable split-horizon procedures for multi-homed sites. Because each of Ethernet segments 14 is multi-homed to multiple PEs 10, the respective ESIs for Ethernet segments 14 are non-zero and unique within system 2.

As described above, each of PEs 10 may advertise MAC advertisement routes (Type-2) to describe a MAC address state. That is, each of PEs 10 may exchange MAC advertisement routes describing the reachability of MAC addresses for an Ethernet segment that was learned by the PE device. A MAC advertisement route advertised by each of PE devices 10A-10D specifies a RD, ESI, Ethernet Tag Identifier, MAC address of a host device (and/or IP address of the host device), and MPLS label, for example.

To enable PEs 10 connected to the same Ethernet segment 14 to automatically discover one another and for purposes of Designated Forwarder election per ES, each PE of PEs 10 advertises an Ethernet Segment route (Type-4) for each of the Ethernet segments multi-homed by the PE. For example, PE 10A advertises an Ethernet Segment route for each of Ethernet segments 14A and 14B. An Ethernet Segment route specifies a Route Distinguisher, Ethernet Segment Identifier, and an originating router's network address, for example.

In some examples, PE routers 10A-10C may advertise a Type-7 BGP route to describe a multicast state. A Type-7 BGP route, also referred to herein as a "BGP join synch route," is used for coordinating or synchronizing a multicast join synch request amongst PE routers of an Ethernet segment. In other words, an EVPN may use a Type-7 route to coordinate the IGMP Join (x,G) state for a given EVI between each of the PE routers attached to a given ES when operating in either single or all-active redundancy mode. The Type-7 route indicates that a PE router has received an IGMP join request to join a multicast group on the ES. When one of PE routers receives an IGMP join report on an Ethernet segment from a CE router, it sends out a BGP Type 7 route with the ESI value. Each additional multi-homed PE router on the Ethernet segment imports the Type-7 route and, based on the Type-7 route, synchronizes its IGMP state.

In the example of FIG. 1, PE routers 10 may receive IGMP join reports 20 that report the membership of customer equipment 4 with a particular multicast group. PE routers 10 may send respective Type-7 BGP join synch routes 22A-22C with an ESI value to inform other PE routers on Ethernet segment 14 of the membership of customer equipment 4 with the particular multicast group.

In one example, PE router 10A may receive IGMP join report 20A that reports the membership of customer equipment 4 with a first multicast group. PE router 10A may send a Type-7 BGP join synch route 22A and 22C with an ESI value to inform PE routers 10B and 10C, respectively, of the membership of customer equipment 4 with the first multicast group. PE routers 10B and 10C may each import the respective Type-7 BGP join synch routes and create an IGMP join state that associates customer equipment 4 with the first multicast group.

Similarly, PE routers 10B and 10C may each receive IGMP join reports 20B and 20C, respectively, that report the membership of customer equipment 4 with a second and third multicast groups, respectively. PE routers 10B and 10C may each send Type-7 BGP join synch routes to other PE routers of Ethernet segment 14 such that the other PE routers 10 may be informed of the membership of customer equipment 4 with the second and third multicast groups. In response to exchanging the Type-7 BGP join synch routes, each of PE routers 10A-10C may create an IGMP join state for the first, second, and third multicast groups.

In the example of FIG. 1, PE routers 10 within an EVPN may utilize a BGP NLRI, such as Inclusive Multicast Ethernet Tag (IMET) route (Type-3), to set up a path to forward and receive multicast traffic over the EVPN core. By utilizing IMET, each of PE routers 10 that span the VLAN in that EVPN instance may receive multicast traffic 24 from ingress PE router 10D for source device 11 over the EVPN core 12. That is, by utilizing IMET, ingress PE router 10D may flood multicast traffic 24 to all of PE routers 10A-10C over the EVPN core 12. Additional information with respect to IMET is described in "BGP MPLS-Based Ethernet VPN," Internet Draft, draft-ietf-l2vpn-evpn-11, Oct. 18, 2014, the entire contents of which is incorporated herein by reference.

In the example of FIG. 1, PE routers 10A-10C belong to Ethernet segment 14. In this example, PE router 10B has been elected a DF for forwarding network traffic from EVPN core 12 into Ethernet segment 14. As such, PE router 10B would typically be the only PE router responsible for forwarding multicast traffic 24 from the EVPN core into Ethernet segment 14 for all multicast groups. In one example, ingress PE router 10D may, based on the IMET configuration, flood multicast traffic 24 over the EVPN core to each of PE routers 10A-10C. Non-designated forwarders, e.g., PE routers 10A and 10C, would typically drop multicast traffic 24 that was received over the EVPN core, which would otherwise lead to wasted utilization of the EVPN core bandwidth within network 12.

PE router 10B, as the DF, may become overloaded from forwarding multicast traffic for all multicast groups. Although non-designated forwarders have available bandwidth, a designated forwarder configuration underutilizes the available bandwidth that may provide load-balancing for the multicast traffic.

In accordance with the techniques described herein, each of PE routers 10A-10C may deterministically determine which of the PE routers is to be configured as an elected multicast forwarder for a specific multicast group regardless of which of the PE routers is a designated forwarder or non-designated forwarder for the Ethernet segment.

As noted above, PE router 10A may receive IGMP join report 20A in which customer equipment 4 is reporting its membership to a first multicast group, PE router 10B may receive IGMP join report 20B in which customer equipment 4 is reporting its membership to a second multicast group, and PE router 10C may receive IGMP join report 20C in which customer equipment 4 is reporting its membership to a third multicast group. Each of PE routers 10A-10C may exchange Type-7 routes such that each of PE routers 10A-10C may create IGMP join states to synchronize the multicast groups and EVI to which the IGMP join reports belong.

In addition to exchanging Type-7 BGP join synch routes, in accordance with the techniques described herein, each of PE routers 10A-10C may additionally determine, based on a number of example techniques, whether the PE router is to be configured as an elected multicast forwarder for a specific multicast group, for example. In some examples, one example implementation of an algorithm may include dividing a network address (e.g., Internet Protocol address) for a specific multicast group by the number of multi-homed PE routers on the ESI. The result of the division may provide PE routers 10A-10C an indication in which the PE routers may be elected a multicast forwarder for a particular multicast group. In some examples, an example algorithm may include applying a modulo operation to determine the remainder after a division of the multicast group network address by the number of multi-homed PE routers of Ethernet segment 14, e.g., PE routers 10A-10C, and using the remainder as an indicator of which of the PE routers 10A-10C should operate as the multicast forwarder for the particular group. In some examples, the algorithm may take the join count of different groups elected by different multi-homed PE routers 10A-10C by applying a hash to each of the different groups. In any event, the result of the algorithm may identify which of PE routers 10A-10C is responsible for forwarding multicast traffic to a specific multicast group.

As one example, PE router 10A may apply the algorithm and may determine, e.g., that PE router 10A is to be configured as an elected multicast forwarder for the second multicast group. Similarly, PE routers 10B and 10C may each apply the algorithm and may determine, e.g., that PE routers 10B and 10C are to be configured as elected multicast forwarders for the third and first multicast groups, respectively.

In response to determining which PE router is elected as a multicast forwarder for a specific multicast group, each of PE routers 10A-10C may configure its forwarding state to forward multicast traffic for the corresponding multicast group and to ignore the designated forwarder election algorithm. For example, in response to determining that PE router 10A is the elected multicast forwarder for the second multicast group, PE router 10A may configure its forwarding state to forward multicast traffic 26A into the active-active Ethernet segment 14 for the second multicast group irrespective of being a non-designated forwarder. Likewise, PE router 10C may configure its forwarding state to forward multicast traffic 26C for the first multicast group irrespective of being a non-designated forwarder.

PE router 10B may determine, based on the algorithm, that PE router 10B is an elected multicast forwarder for the third multicast group. PE router 10B may configure its forwarding state to ignore the designated forwarder election algorithm and forward multicast traffic 26B for only the third multicast group regardless of being a designated forwarder for PE routers 10A-10C. For a PE router that is not an elected multicast forwarder for a specific multicast group, the PE router will not forward the traffic toward CE router 8 to avoid sending duplicate traffic.

In this way, each of PE routers 10A-10C of Ethernet segment 14 may be elected multicast forwarder for a specific multicast group such that the PE routers may forward the multicast traffic regardless of which PE router is a designated forwarder or non-designated forwarder. By electing multicast forwarders for specific multicast groups, multicast traffic may be load-balanced across the PE routers of a multi-homed environment.

In some examples, in a network implementing IMET, PE routers 10 may exchange extended IMET routes (Type-3) including at least a multicast identifier. Ingress PE router 10D may configure multicast traffic to include a multicast identifier as a multicast label. Upon receiving the extended Type-3 route, PE routers 10 may determine from the extended IMET route including the multicast identifier that the traffic is identified as multicast traffic. In one example, the IMET route may be extended to include a Default Gateway Extended Community including a multicast identifier that may be used to indicate a packet type as multicast. Additional information with respect to the Default Gateway Extended Community is described in "BGP MPLS-Based Ethernet VPN," RFC 7432, as referenced above.

In some examples, PE router 10A may receive a new IGMP join report 20D for an additional multicast group. PE router 10A may determine whether PE router 10A has the capacity to forward traffic for the additional multicast group. If PE router 10A determines that it does not have the capacity to send multicast traffic for the additional multicast group, PE router 10A may configure, e.g., an extended Type-7 route to inform other PE routers 10 to exclude PE router 10A from being elected as a multicast forwarder for the additional multicast group. In some examples, a Type-7 BGP join synch route may be extended to include an EVI-RT Extended Community described in "IGMP and MLD Proxy for EVPN," Internet Draft, draft-ieft-bess-evpn-igmp-mld-proxy-00, Mar. 27, 2017, Section 7.5, to include an indication that the PE router 10A is to be excluded from an election for a multicast forwarder. In this way, a subset of PE routers, e.g., PE routers 10B and 10C, of Ethernet segment 14 may receive the extended Type-7 route for which the PE routers may elect a multicast forwarder for the additional multicast group only from the subset of PE routers. In this way, PE router 10A, is excluded from the multicast forwarder election.

Figure 2:
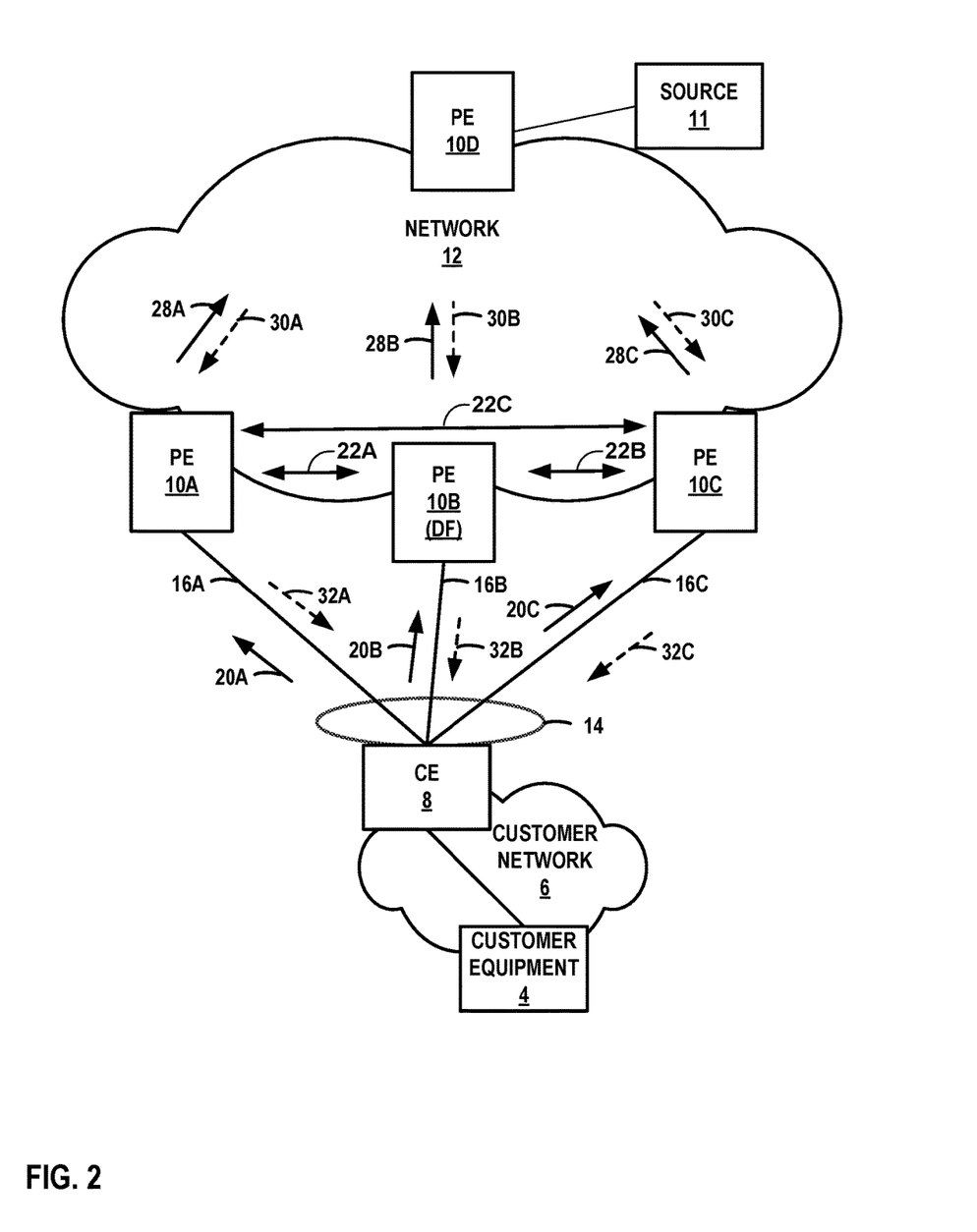
FIG. 2 is a block diagram illustrating another example network system for performing load-balancing responsibility for forwarding of multicast traffic into an active-active Ethernet segment between two or more multi-homed provider edge routers in an Ethernet Virtual Private Network, in accordance with the techniques described in this disclosure.

FIG. 2 is a block diagram illustrating another example network system 2 for performing load-balancing responsibility for forwarding of multicast traffic into an active-active Ethernet segment between two or more multi-homed provider edge routers in an Ethernet Virtual Private Network, in accordance with the techniques described in this disclosure. Network system 2 of FIG. 2 is similar to network system 2 of FIG. 1, except as described below.

In the example of FIG. 2, PE routers 10 may use Selective Multicast Ethernet Tag (SMET) routes to set up a path to selectively forward and receive multicast traffic over EVPN core 12. Unlike IMET in which ingress PE router 10D floods multicast traffic to all PE routers 10A-10C, SMET provides a carrying solution for PE routers 10 to selectively forward and receive multicast traffic from ingress PE router 10D by sending a Type-6 route. A Type-6 route indicates that a PE router supports a SMET route. In the example of FIG. 2, an egress PE router, e.g., any of PE routers 10A-10C, may send a respective one of Type-6 routes 28A-28C (collectively, "Type-6 routes 28") that advertises a multicast source address, multicast group address, and the network address of the egress PE router, for example. In response, ingress PE router 10D may forward multicast traffic for the specific multicast group to the egress PE router that sent the Type-6 route. For example, PE router 10A may send Type-6 route 28A requesting ingress PE router 10D to forward multicast traffic for a specific multicast group. In response, ingress PE router 10D may forward multicast traffic to PE router 10A for the specific multicast group since PE router 10A had sent the Type-6 route. Further examples of SMET is described in "IGMP and MLD Proxy for EVPN," Internet Draft, draft-sajassi-bess-evpn-igmp-mld-proxy-00, Oct. 17, 2015, the entire contents of which is incorporated by reference herein.

PE router 10B, as the designated forwarder for the EVPN, typically sends multiple Type-6 routes to ingress PE router 10D to request traffic for each of the multicast groups. Ingress PE router 10D may, based on the SMET configuration, send multicast traffic in response to the Type-6 routes to PE router 10B. In contrast, when non-designated forwarders, e.g., PE routers 10A and 10C, send Type-6 routes to request multicast traffic from ingress PE router 10D, the non-designated forwarders may receive the multicast traffic, but may not forward the multicast traffic, which unnecessarily consumes EVPN core bandwidth.

As described in FIG. 1, the designated forwarder may become overloaded from forwarding the multicast traffic for all multicast groups. Although non-designated forwarders have available bandwidth, a designated forwarder configuration underutilizes the available bandwidth that may provide load-balancing for the multicast traffic.

In accordance with the techniques described herein, each of PE routers 10A-10C may deterministically determine whether the PE router is to be configured as an elected multicast forwarder for a specific multicast group regardless of which PE router is a designated forwarder or non-designated forwarder. In addition to determining, based on an algorithm, whether the PE router is to be elected as a multicast forwarder for a specific multicast group, the PE routers may also send respective Type-6 routes 28A-28C to request multicast traffic for a specific multicast group from ingress PE router 10D.

For example, as noted above, PE routers 10A-10C may receive respective IGMP join reports 20 in which customer equipment 4 is reporting its membership to a specific multicast group. PE routers 10A-10C may exchange Type-7 routes to synchronize the IGMP join states based on IGMP join reports 20 such that each of PE routers 10A-10C may create IGMP join states including the first, second, and third multicast groups.

Each of PE routers 10A-10C may run an algorithm to determine deterministically whether the PE router may be configured as an elected multicast forwarder for a specific multicast group. For example, PE router 10A may run the algorithm described above and determine, e.g., that PE router 10A is to be configured as an elected multicast forwarder for the second multicast group. PE routers 10B and 10C may each run the algorithm and determine, e.g., that PE routers 10B and 10C are to be configured as an elected multicast forwarder for the third multicast group and the first multicast group, respectively.

If each of PE routers 10A-10C determines that it is an elected multicast forwarder, each of PE routers 10A-10C may configure its forwarding state to ignore a designated forwarder calculation such that the PE router may forward multicast traffic into the active-active Ethernet segment 14 for a specific multicast group regardless of which PE router is a designated forwarder or non-designated forwarder.

In the example of FIG. 2, the PE router may additionally send a Type-6 route to request from ingress PE router 10D to receive multicast traffic for a specific multicast group for which the PE router has been elected a multicast forwarder. For example, if PE router 10A is determined to be an elected multicast forwarder for the second multicast group, PE router 10A may send Type-6 route 28A to ingress PE router 10D to request multicast traffic for the second multicast group be sent back to PE router 10A. In this way, the elected multicast forwarder for a specific multicast group, and not the designated forwarder (e.g., PE device 10B), may retrieve the multicast traffic for a specific multicast group. In this way, the designated forwarder is no longer responsible for sending Type-6 routes and receiving multicast traffic for all multicast groups.

In a network implementing SMET, ingress PE router 10D may selectively forward multicast traffic 30A-30C over the EVPN core 12 to a corresponding one of PE routers 10A-10C that sent a Type-6 route. Continuing the example above, ingress PE router 10D may forward multicast traffic 30A for the second multicast group to PE router 10A in response to Type-6 route 28A that was sent by PE router 10A. Similarly, ingress PE router 10D may forward multicast traffic 30C for the first multicast group to PE router 10C in response to Type-6 route 28C that was sent by PE router 10C. Upon receiving the multicast traffic for the second multicast group, PE routers 10A and 10C may, instead of dropping the multicast traffic as non-designated forwarders, forward the multicast traffic into Ethernet segment 14 for the second multicast group and the first multicast group, respectively.

Ingress PE router 10D may also forward multicast traffic 30B for the third multicast group to PE router 10B in response to Type-6 route 28B that was sent by PE router 10B. PE router 10B may, instead of forwarding multicast traffic for all multicast groups as a designated forwarder, forward only the multicast traffic for the third multicast group into Ethernet segment 14. In this way, by electing multicast forwarders for specific multicast groups, multicast traffic may be load-balanced across the PE routers of a multi-homed environment.

Figure 3:
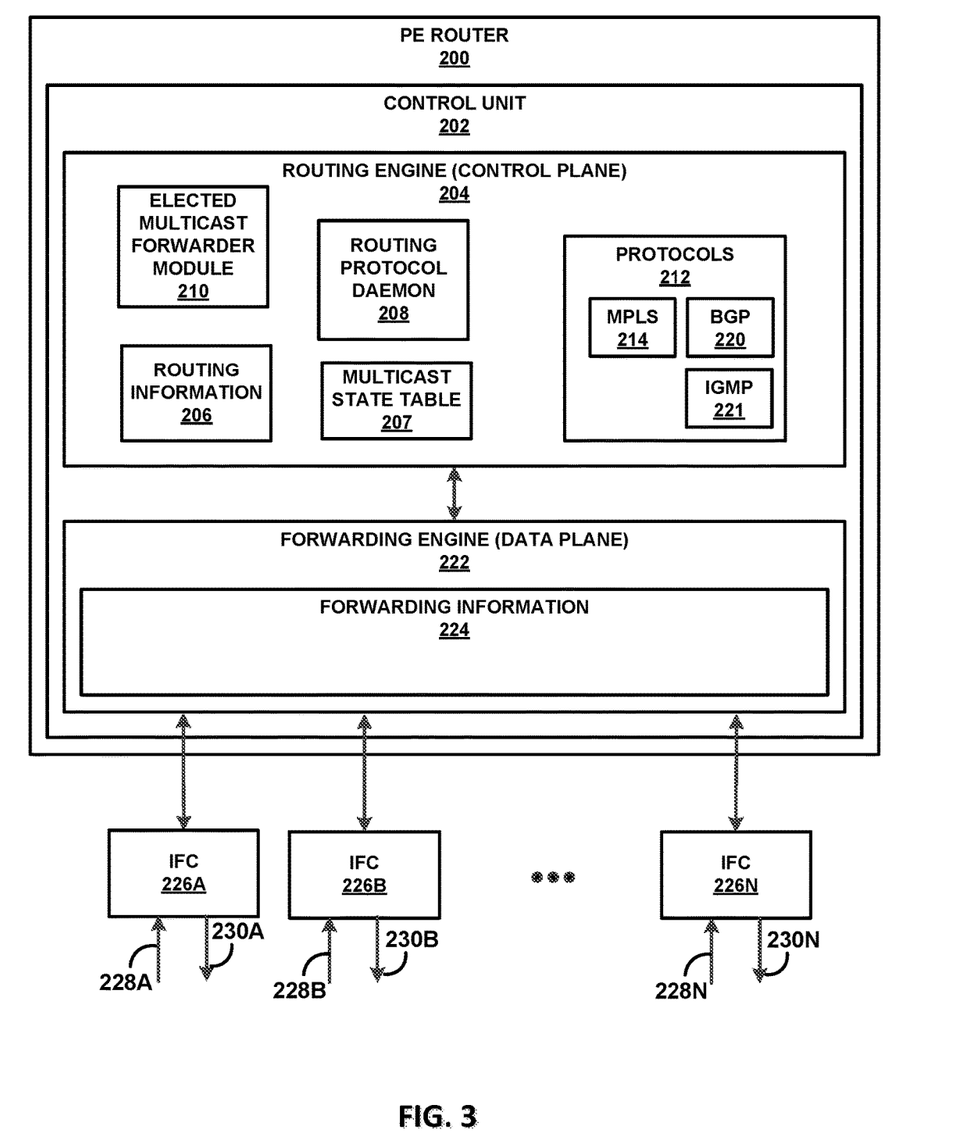
FIG. 3 is a block diagram illustrating an example of a provider edge router, in accordance with the techniques described in this disclosure.

FIG. 3 is a block diagram illustrating an example PE router 200 within an EVPN in accordance with the techniques of the disclosure. In general, PE router 200 is described with respect to any of PE routers 10A-10C of FIGS. 1-2. In this example, PE router 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports (not shown). PE router 200 also includes a control unit 202 that determines routes of received packets and forwards the packets accordingly via IFCs 226.

Control unit 202 includes a routing engine 204 and a forwarding engine 222. Routing engine 204 operates as the control plane for PE router 200 and includes an operating system that provides a multi-tasking operating environment for execution of a number of concurrent processes. Routing engine 204, for example, executes software instructions to implement one or more control plane networking protocols 212. For example, protocols 212 may include one or more routing protocols, such as BGP 220, for exchanging routing information with other routing devices and for updating routing information 206, Multiprotocol Label Switching (MPLS) protocol 214, and Internet Group Management Protocol (IGMP) 221. A routing protocol daemon (RPD) 208 executes protocols 212. Routing engine 204 further includes a multicast state table 207. Multicast state table 207 maintains IGMP state data for a plurality of multicast groups to which PE router 200 belongs.

In addition, routing engine 204 communicates with other routers to establish and maintain an EVPN, such as the EVPN of FIG. 1, for transporting L2 communications through an intermediate L3 network so as to logically extend an Ethernet network through the intermediate L3 network. When implementing an EVPN, L2 MAC learning may be performed in the control plane by exchanging, with remote PE devices, BGP messages containing MAC addresses. For example, routing engine 204 uses information recorded in routing information 206 to compose messages describing routing and reachability, which forwarding engine 222 sends to other PE routers 200 within the EVPN. In some examples, routing engine 204 composes such routing and reachability messages according to a routing protocol, such as BGP protocol 220. Additional example information with respect to EVPN and the BGP protocol is described in "BGP MPLS-Based Ethernet VPN," RFC 7432, as referenced above.

Forwarding information 224 included in forwarding engine 222 may include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Routing information 206 may describe a topology of the computer network in which PE router 200 resides, and may also include routes through the shared trees in the computer network. Routing information 206 describes various routes within the computer network, and the appropriate next hops for each route, i.e., the neighboring routing devices along each of the routes. Routing engine 204 analyzes information stored in routing information 206 and generates forwarding information for forwarding engine 222, stored in forwarding information 224. Forwarding information 224 may associate, for example, network destinations for certain multicast groups with specific next hops and corresponding IFCs 226 and physical output ports for output links 230. Forwarding information 224 may be a radix tree programmed into dedicated forwarding chips, a series of tables, a complex database, a link list, a radix tree, a database, a flat file, or various other data structures.

If a PE router 200, either the DF or a non-DF PE router, receives, on a given multi-homed Ethernet segment operating in all-active redundancy mode, an IGMP join report for (x, G), it determines the EVI to which the IGMP join report belongs. If PE router 200 does not already have a local IGMP Join (x, G) state for that EVI on that ES in the routing information 206 of PE router 200, PE router 200 instantiates a local IGMP Join (x, G) state in multicast state table 207, installs a BGP Type-7 route, e.g., a BGP join synch route, in routing information 206, and advertises the BGP Type-7 route for that [ES, EVI, BD] to other PE routers on the Ethernet segment. In this example, Local IGMP Join (x, G) state refers to an IGMP Join (x, G) state that is created as the result of processing an IGMP join report for (x, G).

The BGP join synch route carries the ES-Import Route Target (RT) for the ES on which the IGMP Membership Report was received. PE router 200 issues the BGP join synch route to all PE routers attached to that ES. Thus, all PE routers attached to the ES receive the BGP join synch route, but PE routers not attached to the ES do not receive the BGP join synch route.

If a PE router 200, either the DF or a non-DF PE router, receives a BGP join synch route from a peer PE router on a same ES, PE router 200 installs that route in routing information 206. If PE router 200 does not already have an IGMP Join (x, G) state for that EVI on that ES, the PE router instantiates that IGMP Join (x,G) state in multicast state table 207. In other words, the IGMP Join (x, G) state of PE router 200 is both multicast groups for which PE router has originated BGP join synch routes, as well as multicast groups for which PE router has received (and installed) BGP join synch routes. If the DF is not currently advertising (originating) a BGP join synch route for that (x, G) group in that EVI, the DF may do so now.

PE router 200 may, at configuration and startup, perform a designated forwarder election algorithm to determine an ordering (e.g., "designated forwarder ordering") with which one of PE routers, e.g., PE routers 10A-10C, become the designated forwarder for one or more EVIs of Ethernet segment 14. Each of PE routers 10A-10C perform the same designated forwarder algorithm to ensure that each of PE routers 10A-10C determine the same ordering. For instance, routing engine 204 of PE router 10A may send one or more control plane messages to PE routers 10B-10C. Routing engine 204, in some examples, sends the control plane messages using a layer 3 protocol such as BGP. The control plane messages may request information from the other PE routers, such as network addresses associated with each of the PE routers.

Routing engine 204 may determine respective orderings with which PE routers 10A-10C become the designated forwarder. For instance, routing engine 204 may use a hash function that takes as input, a value comprised of the network address for a given PE router and the common VLAN tag. The output of the hash function may be a hashcode for the given PE router. Routing engine 204 may generate a set of hashcodes, one hash code for each respective PE router. Routing engine 204, in some examples, may sort the set of hashcodes in an ordering (e.g., ascending or descending). Routing engine 204 may then determine the designated forwarder is, for example, the PE router associated with the hashcode that corresponds to the smallest index of the ordering. For instance, an ordering may have an index from 0 . . . n. The smallest index of the ordering may therefore be 0.

According to the techniques of the disclosure, PE router 200 may include an elected multicast forwarder module 210 for deterministically determining whether PE router 200 may be an elected multicast forwarder for a specific multicast group. For example, elected multicast forwarder module 210 may determine, based on an algorithm, whether PE router 200 is to be elected as a multicast forwarder for a particular multicast group, and may forward multicast traffic for the particular multicast group regardless of which of the PE routers is a DF or non-DF for the Ethernet segment.

In some examples, elected multicast forwarder module 210 may run an algorithm that divides a group network address of a multicast group stored in multicast state table 207 by a number of multi-homed PE routers in the Ethernet segment. Referring to FIG. 1, the elected multicast forwarder module 210 may run the algorithm to divide a group network address by three, which is the number of multi-homed PE routers in Ethernet segment 14. The result of the algorithm may indicate which of PE routers 10A-10C to service a specific multicast group.

In some examples, the elected multicast forwarder module 210 may run an algorithm based on a modulo operation. For example, elected multicast forwarder module 210 may elect PE router 200 to be the elected multicast forwarder for a particular multicast group on Ethernet segment 14 when the PE router is identified as a result of the modulo operation. For example, the elected multicast forwarder module 210 may determine the remainder after a division of the multicast group network address by the number of multi-homed PE routers of Ethernet segment 14, e.g., PE routers 10A-10C, and using the remainder as an indicator whether PE router 200 should operate as the multicast forwarder for a particular group.

In some examples, elected multicast forwarder module 210 may take the join count of different groups elected by different multi-homed PE routers 10A-10C by applying a hash to each of the different groups. For example, elected multicast forwarder module 210 may generate a set of hashcodes, one hash code for each multicast group. Elected multicast forwarding module 210 may sort the set of hashcodes in an ordering (e.g., ascending or descending). Elected multicast forwarder module 210 may then determine the elected multicast forwarder for a specific multicast group is, for example, the PE router associated with the hashcode that corresponds with the smallest index of the ordering.

In response to determining whether PE router 200 is to be configured as an elected multicast forwarder for a specific multicast group, elected multicast forwarder module 210 may, for example, configure PE router 200 to ignore the designated forwarder ordering and to forward multicast traffic to the specific multicast group. That is, PE router 200 may rely on the elected multicast forwarder algorithm instead of a designated forwarder algorithm when forwarding multicast traffic for a specific multicast group.

Figure 4:
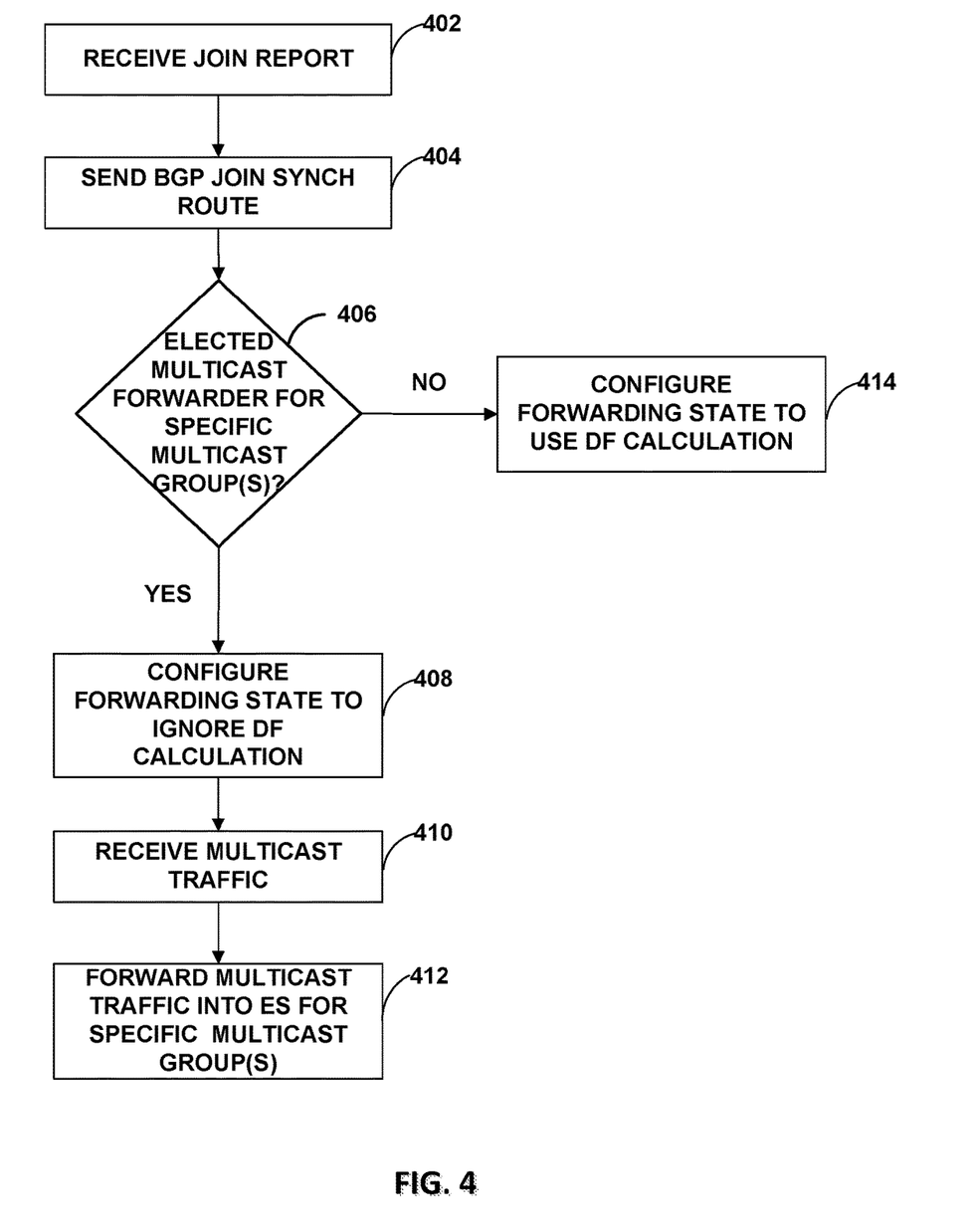
FIG. 4 is a flowchart illustrating an example operation of a provider edge router, in accordance with the techniques described in this disclosure.

FIG. 4 is a flowchart illustrating an example operation of a provider edge router, in accordance with the techniques described in this disclosure. For illustration purposes, FIG. 4 is described with respect to PE router 200 of FIG. 3 operating as PE router 10A of FIG. 1. Although the examples described below are illustrated with respect to PE router 10A, any of PE routers 10 of FIG. 1 may perform the described examples.

PE router 10A may receive an IGMP join report including membership information to a specific multicast group for customer equipment 4 (402). For example, PE router 10A may receive IGMP join report 20A from customer equipment 4 via any of inbound links 228 that may include information that customer equipment 4 has joined a first multicast group. PE router 10A may determine from the IGMP join report the EVI to which the IGMP join report belongs. Upon receiving the IGMP join report, PE router 10A may instantiate an IGMP join state in its multicast state table 207 to include the first multicast group.

PE router 10A may send a Type-7 BGP join synch route to other PE routers 10 to synchronize the join state (404). For example, in response to receiving the IGMP join report, PE router 10A may install a Type-7 BGP route, e.g., a BGP join synch route, in routing information 206 and may advertise the Type-7 BGP route via any of outbound links 230 to other PE routers 10, e.g., PE routers 10B and 10C, on Ethernet segment 14. PE router 10A may issue the BGP join synch route to all PE routers attached to Ethernet segment 14 such that each of the PE routers attached to Ethernet segment 14 may receive the BGP join synch route and to instantiate its IGMP join state in its multicast state table with the information included in the BGP join synch route. Although not shown, PE router 10A may also receive Type-7 BGP join synch routes from other PE routers 10 such that PE router 10A may instantiate its IGMP join state with the information included in the received BGP join synch routes.

PE router 10A may deterministically determine whether PE router 10A is to be configured as an elected multicast forwarder for one or more specific multicast groups (406). For example, PE router 10A may include an elected multicast forwarder module 210 to run an algorithm to deterministically determine whether PE router 10A is to be configured as an elected multicast forwarder for the one or more specific multicast groups. Other remote PE routers in the Ethernet segment may run the algorithm to determine other specific multicast groups for which the remote PE routers are to forward multicast traffic.

In response to determining that PE router 10A is to be configured as an elected multicast forwarder for the one or more specific multicast groups, PE router 10A may configure its forwarding state to ignore DF calculation and to forward multicast traffic for the one or more multicast groups for which PE router 10A is the elected multicast forwarder (408). For example, forwarding engine 222 may be configured to ignore the designated forwarder orderings configured for Ethernet segment 14. In this way, PE router 10A may forward multicast traffic to the one or more specific multicast groups regardless of whether PE router 10A is a designated forwarder or a non-designated forwarder.

PE router 10A may receive multicast traffic via one of inbound links 226 over the EVPN core 12 (410). For example, in an IMET configuration, ingress PE router 10D may flood multicast traffic to all PE routers, including PE router 10A, over the EVPN core.

PE router 10A may, based on the newly configured forwarding state, forward the received multicast traffic into Ethernet segment 14 for the one or more specific multicast groups (412). For example, in response to receiving the multicast traffic over EVPN core 12, PE router 10A may forward the multicast traffic into Ethernet segment 14 for the specific multicast group instead of dropping the multicast traffic as typically required for a non-designated forwarder. That is, PE router 10A may ignore the designated forwarder calculation and proceed to forward the multicast traffic for the one or more specific multicast groups. In some examples in which PE router 10A is a designated forwarder, PE router 10A may forward multicast traffic only for one or more specific multicast groups for which it has been elected to be the multicast forwarder instead of forwarding traffic for all PE routers 10.

In some examples, PE router 10A may determine it is not to be configured as an elected multicast forwarder. In this example, PE router 10A may continue forwarding multicast traffic based on the designated forwarder calculation (414). For example, if PE router 10A is a non-designated forwarder and is not configured as an elected multicast forwarder, PE router 10A drops the multicast traffic received over the EVPN core.

Figure 5:
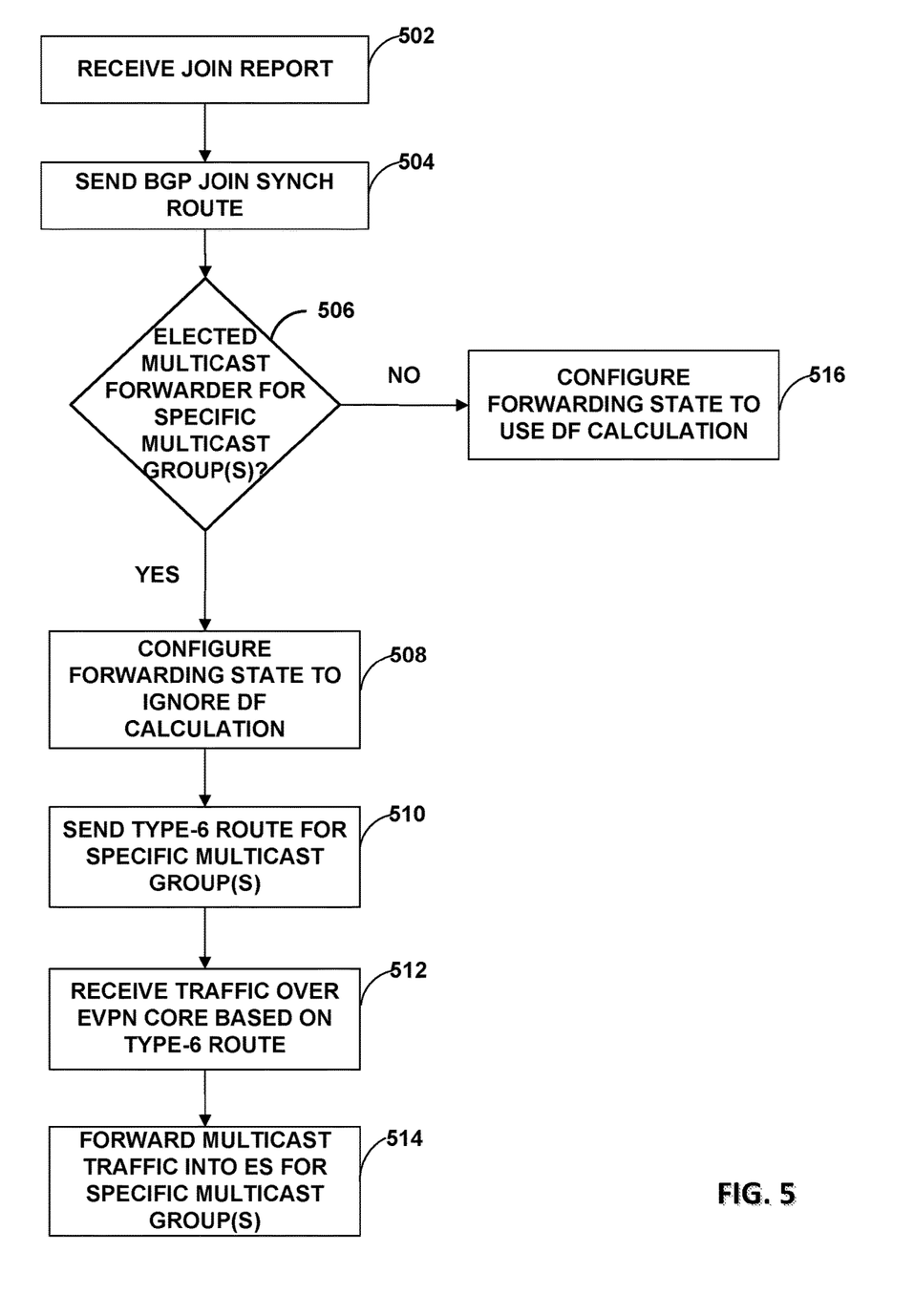
FIG. 5 is a flowchart illustrating another example operation of a provider edge router, in accordance with the techniques described in this disclosure.

FIG. 5 is a flowchart illustrating another example operation of a provider edge router, in accordance with the techniques described in this disclosure. For illustration purposes, FIG. 5 is described with respect to PE router 200 of FIG. 3 operating as PE router 10A of FIG. 2. Although the examples described below are illustrated with respect to PE router 10A, any of PE routers 10 may perform the described examples.

PE router 10A may receive an IGMP join report including membership information to a specific multicast group for customer equipment 4 (502). For example, PE router 10A may receive IGMP join report 20A via any of inbound links 228 from customer equipment 4 that may include information that customer equipment 4 has joined a first multicast group. PE router 10A may determine from the IGMP join report the EVI to which the IGMP join report belongs. PE router 10A may instantiate an IGMP join state in its multicast state table 207 to include the first multicast group.

PE router 10A may send a Type-7 BGP join synch route to other PE routers 10 to synchronize the join state (504). For example, in response to receiving the IGMP join report, PE router 10A may install a Type-7 BGP route, e.g., a BGP join synch route, in routing information 206 and may advertise the Type-7 BGP route via any of outbound links 230 to other PE routers 10, e.g., PE routers 10B and 10C, on Ethernet segment 14. PE router 10A may issue the BGP join synch route to all PE routers attached to Ethernet segment 14 such that each of the PE routers attached to Ethernet segment 14 may receive the BGP join synch route and to instantiate its IGMP join state in its multicast state table with the information included in the BGP join synch route. Although not shown, PE router 10A may also receive Type-7 BGP join synch routes from other PE routers 10 such that PE router 10A may instantiate its IGMP join state with the information included in the received BGP join synch routes.

PE router 10A may deterministically determine whether PE router 10A is to be configured as an elected multicast forwarder for one or more specific multicast groups (506). For example, PE router 10A may include an elected multicast forwarder module 210 to run an algorithm to deterministically determine whether PE router 10A is to be configured as an elected multicast forwarder for the one or more specific multicast groups. Other remote PE routers in the Ethernet segment may run the algorithm to determine other specific multicast groups for which the remote PE routers are to forward multicast traffic.

In response to determining that PE router 10A is to be configured as an elected multicast forwarder for the one or more specific multicast groups, PE router 10A may configure its forwarding state to ignore DF calculation and to forward multicast traffic for the one or more multicast groups for which PE router 10A is the elected multicast forwarder (508). For example, forwarding engine 222 may be configured to ignore the designated forwarder ordering configured for Ethernet segment 14. In this way, PE router 10A may forward multicast traffic to the one or more specific multicast groups regardless of whether PE router 10A is a designated forwarder or a non-designated forwarder.

PE router 10A may send, e.g., a Type-6 route to request multicast traffic for the one or more specific multicast groups from ingress PE router 10D be sent to PE router 10A (510). For example, in an SMET configuration, ingress PE router 10D may selectively forward multicast traffic for the one or more specific multicast groups to a PE router that sent the Type-6 route. As one example, PE router 10A may send a Type-6 route requesting multicast traffic for a first multicast group.

PE router 10A may receive multicast traffic via one of inbound links 226 based on the Type-6 route over the EVPN core 12 (512). For example, in an SMET configuration, ingress PE router 10D may selectively send multicast traffic for a first multicast group to PE router 10A because PE router 10A sent a Type-6 route requesting to receive multicast traffic for the first multicast group.

PE router 10A may, based on the newly configured forwarding state, forward the received multicast traffic into Ethernet segment 14 for the one or more specific multicast groups (514). Upon receiving the multicast traffic over EVPN core 12, PE router 10A may forward the multicast traffic into Ethernet segment 14 instead of dropping the multicast traffic as typically required for a non-designated forwarder. That is, PE router 10A may ignore the designated forwarder calculation and proceed to forward the multicast traffic for the one or more specific multicast groups. In some examples where PE router 10A is a designated forwarder, PE router 10A may forward multicast traffic only for one or more specific multicast groups for which it has been elected to be the multicast forwarder and drop the traffic for the other multicast groups.

In some examples, PE router 10A may determine it is not to be configured as an elected multicast forwarder. In this example, PE router 10A may continue forwarding multicast traffic based on the designated forwarder calculation (516). For example, if PE router 10A is a non-designated forwarder and is not configured as an elected multicast forwarder, PE router 10A drops the multicast traffic received over the EVPN core.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various examples of the techniques have been described. These and other examples are within the scope of the following claims.

What is claimed is:

1. A method comprising:
   receiving, by a provider edge (PE) router of a plurality of PE routers configured with an Ethernet Virtual Private Network (EVPN) instance reachable by an Ethernet segment connecting the plurality of PE devices to a customer edge (CE) router that is multi-homed to the plurality of PE routers over the Ethernet segment, an Internet Group Management Protocol (IGMP) join report for a multicast group;
   sending, by the PE router and to the plurality of PE routers, one or more Border Gateway Protocol (BGP) join synch routes used to synchronize the IGMP join report for the multicast group across the Ethernet segment;
   deterministically determining, by the PE router, whether the PE router is configured to be an elected multicast forwarder for at least one of a plurality of multicast groups;
   in response to determining that the PE router is configured to be the elected multicast forwarder for the one of the plurality of multicast groups, configuring, by the PE router, a forwarding state of the PE router to forward multicast traffic for the one of the plurality of multicast groups into the Ethernet segment and to ignore a designated forwarder election for the Ethernet segment;
   receiving, by the PE router, multicast traffic from an ingress PE router of the plurality of PE routers; and
   forwarding, by the PE router, the multicast traffic into the Ethernet segment for the one of the plurality of multicast groups.

2. The method of claim 1, wherein deterministically determining whether the PE router is configured to be the elected multicast forwarder for the one of the plurality of multicast groups comprises:
   determining a result from dividing a network address of the one of the plurality of multicast groups by a number of the plurality of PE routers included in the Ethernet segment.

3. The method of claim 1, wherein deterministically determining whether the PE router is configured to be the elected multicast forwarder for one of the plurality of multicast groups comprises:
   determining a remainder result from a modulo operation dividing a network address of the one of the plurality of multicast groups by a number of the plurality of PE routers included in the Ethernet segment.

4. The method of claim 1, wherein deterministically determining whether the PE router is configured to be the elected multicast forwarder for one of the plurality of multicast groups comprises:
   determining a join count by applying a hash to each of the plurality of multicast groups.

5. The method of claim 1, wherein receiving the multicast traffic from the ingress PE router of the plurality of PE routers comprises:

sending, by the PE router, a Selective Multicast Ethernet Tag (SMET) route for requesting multicast traffic for the one of the plurality of multicast groups from the ingress PE router; and receiving, by the PE router and from the ingress PE router, based on the SMET route, multicast traffic for the one of the plurality of multicast groups.

6. The method of claim 1, further comprising:
in response to determining that the PE router is not configured to be the elected multicast forwarder for the one of the plurality of multicast groups, configuring, by the PE router, the forwarding state of the PE router to use the designated forwarder calculation.

7. The method of claim 1, wherein receiving the multicast traffic from the ingress PE router comprises:
receiving, by the PE router, an extended Inclusive Multicast Ethernet Tag (IMET) route that includes at least a multicast label for identifying the multicast traffic as a multicast type.

8. The method of claim 1, further comprising:
configuring, by the PE router, an extended BGP join synch route including an indication to exclude the PE router from being elected as a multicast forwarder for the plurality of multicast groups.

9. A provider edge (PE) router comprising:
a memory; and
one or more processors operably coupled to the memory, wherein the one or more processors and memory are configured to:
receive configuration data configuring the PE router with an Ethernet Virtual Private Network (EVPN) instance reachable by an Ethernet segment connecting a plurality of PE devices, including the PE router, to a customer edge (CE) router that is multi-homed to the plurality of PE routers over the Ethernet segment;
receive an Internet Group Management Protocol (IGMP) join report for a multicast group;
send, to the plurality of PE routers, one or more Border Gateway Protocol (BGP) join synch routes used to synchronize the IGMP join report for the multicast group across the Ethernet segment;
deterministically determine whether the PE router is configured to be an elected multicast forwarder for one of a plurality of multicast groups;
in response to determining that the PE router is configured to be the elected multicast forwarder for the one of the plurality of multicast groups, configure a forwarding state of the PE router to forward multicast traffic for the one of the plurality of multicast groups into the Ethernet segment and to ignore a designated forwarder election for the Ethernet segment;
receive the multicast traffic from an ingress PE router of the plurality of PE routers; and
forward the multicast traffic into the Ethernet segment for the one of the plurality of multicast groups.

10. The PE router of claim 9, wherein, to deterministically determine whether the PE router is configured to be the elected multicast forwarder for one of the plurality of multicast groups, the one or more processors and memory are further configured to:
determine a result from dividing a network address of the one of the plurality of multicast groups by a number of the plurality of PE routers included in the Ethernet segment.

11. The PE router of claim 9, wherein, to deterministically determine whether the PE router is configured to be the elected multicast forwarder for one of the plurality of multicast groups, the one or more processors and memory are further configured to:
determine a remainder result from a modulo operation dividing a network address of the one of the plurality of multicast groups by a number of the plurality of PE routers included in the Ethernet segment.

12. The PE router of claim 9, wherein, to deterministically determine whether the PE router is configured to be the elected multicast forwarder for one of the plurality of multicast groups, the one or more processors and memory are further configured to:
determine a join count by applying a hash to each of the plurality of multicast groups.

13. The PE router of claim 9, wherein, to receive the multicast traffic from the ingress PE router of the plurality of PE routers, the one or more processors and memory are further configured to:
send a Selective Multicast Ethernet Tag (SMET) route for requesting multicast traffic for the one of the plurality of multicast groups from the ingress PE router; and
receive, from the ingress PE router, based on the SMET route, multicast traffic for the one of the plurality of multicast groups.

14. The PE router of claim 9, the one or more processors and memory are further configured to:
in response to determining that the PE router is not configured to be the elected multicast forwarder for the one of the plurality of multicast groups, configure the forwarding state of the PE router to use the designated forwarder calculation.

15. The PE router of claim 9, wherein, to receive the multicast traffic from the ingress PE router of the plurality of PE routers, the one or more processors and memory are further configured to:
receive an extended Inclusive Multicast Ethernet Tag (IMET) route that includes at least a multicast label for identifying the multicast traffic as a multicast type.

16. The PE router of claim 9, the one or more processors and memory are further configured to:
configure an extended BGP join synch route including an indication to exclude the PE router from being elected as a multicast forwarder for the plurality of multicast groups.

17. A non-transitory computer-readable storage medium comprising instructions for causing one or more programmable processors to: receive configuration data configuring the PE router with an Ethernet Virtual Private Network (EVPN) instance reachable by an Ethernet segment connecting a plurality of PE devices, including the PE router, to a customer edge (CE) router that is multi-homed to the plurality of PE routers over the Ethernet segment receive an Internet Group Management Protocol (IGMP) join report for a multicast group; send, to the plurality of PE routers, one or more Border Gateway Protocol (BGP) join synch routes used to synchronize the IGMP join report for the multicast group across the Ethernet segment; deterministically determine whether the PE router is configured to be an elected multicast forwarder for one of a plurality of multicast groups; in response to determining that the PE router is configured to be the elected multicast forwarder for the one of the plurality of multicast groups, configure a forwarding state of the PE router to forward multicast traffic for the one of the plurality of multicast groups into the Ethernet segment and to ignore a designated forwarder election for the Ethernet segment; receive the multicast traffic from an ingress PE router of the plurality of PE routers; and forward the multicast traffic into the Ethernet segment for the one of the plurality of multicast groups.

18. The non-transitory computer-readable storage medium of claim 17, wherein, to deterministically determine whether the PE router is configured to be an elected multicast forwarder for one of the plurality of multicast groups, further comprising instructions for causing one or more programmable processors to: determine a result from dividing a network address of the one of the plurality of multicast groups by a number of the plurality of PE routers included in the Ethernet segment.

19. The non-transitory computer-readable storage medium of claim 17, wherein, to deterministically determine whether the PE router is configured to be an elected multicast forwarder for one of the plurality of multicast groups, further comprising instructions for causing one or more programmable processors to: determine a join count by applying a hash to each of the plurality of multicast groups.

20. The non-transitory computer-readable storage medium of claim 17, further comprising instructions for causing one or more programmable processors to: send a Selective Multicast Ethernet Tag (SMET) route for requesting multicast traffic for the one of the plurality of multicast groups from the ingress PE router; and receive, from the ingress PE router, based on the SMET route, multicast traffic for the one of the plurality of multicast groups.

* * * * *